US011826914B1

(12) United States Patent
Mao et al.

(10) Patent No.: US 11,826,914 B1
(45) Date of Patent: Nov. 28, 2023

(54) MECHANICAL ARM TYPE MEASURING ROBOT DEVICE AND APPLICATION METHOD

(71) Applicant: Beijing LongRuan Technologies Inc., Beijing (CN)

(72) Inventors: Shanjun Mao, Beijing (CN); Xinchao Li, Beijing (CN); Huazhou Chen, Beijing (CN)

(73) Assignee: Beijing LongRuan Technologies Inc., Beijing (CN)

( * ) Notice: Subject to any disclaimer, the term of this patent is extended or adjusted under 35 U.S.C. 154(b) by 0 days.

(21) Appl. No.: 18/213,275

(22) Filed: Jun. 23, 2023

(30) Foreign Application Priority Data

Aug. 3, 2022 (CN) .......................... 202210928529.4

(51) Int. Cl.
*B25J 19/00* (2006.01)
*B25J 9/16* (2006.01)
(Continued)

(52) U.S. Cl.
CPC ............ *B25J 9/1676* (2013.01); *B25J 11/00* (2013.01); *B25J 18/025* (2013.01); *B25J 19/0075* (2013.01)

(58) Field of Classification Search
CPC ......... B29B 7/7466; B29B 7/183; B29B 7/94; B29B 7/7495; B29B 7/246; B29B 7/7485;
(Continued)

(56) References Cited

U.S. PATENT DOCUMENTS

| 11,090,806 | B2 * | 8/2021 | Nocon ................. B25J 11/0035 |
| 2016/0157428 | A1 * | 6/2016 | Pitzer ..................... A01D 46/30 |
| | | | 701/50 |

(Continued)

FOREIGN PATENT DOCUMENTS

| CN | 110470283 A | 11/2019 |
| CN | 111380522 A | 7/2020 |

(Continued)

OTHER PUBLICATIONS

Šumanas et al., Determination of Excavator Tool Position using Absolute Sensors, 2021, IEEE, p. 1-5 (Year: 2021).*

(Continued)

*Primary Examiner* — McDieunel Marc
(74) *Attorney, Agent, or Firm* — Bayramoglu Law Offices LLC (57) ABSTRACT mechanical arm type measuring robot device and an application method, and relates to the technical field of intelligent coal mine mining. The mechanical arm type measuring robot device comprises an automatic leveling total station, a protection mechanism, a pitch adjusting mechanism, a yaw adjusting mechanism, a vertical rotating mechanism, a controller, a mounting base and a mobile terminal. Based on a preset pitch angle and a preset yaw angle, the measuring robot starts from an initial position, and performs extension and retraction actions in a plurality of degrees of freedom in the pitch adjusting mechanism and the yaw adjusting mechanism to move the total station to a preset working position.

18 Claims, 3 Drawing Sheets

(51) Int. Cl.
*B25J 11/00* (2006.01)
*B25J 18/02* (2006.01)

(58) Field of Classification Search
CPC ........ B25J 9/1676; B25J 11/00; B25J 18/025; B25J 19/0075
See application file for complete search history.

(56) References Cited

U.S. PATENT DOCUMENTS

| | | | |
|---|---|---|---|
| 2016/0157429 A1* | 6/2016 | Pitzer | A01D 46/30 701/23 |
| 2017/0106738 A1* | 4/2017 | Gillett | B62K 11/007 |
| 2019/0041207 A1 | 2/2019 | Nishita | |
| 2019/0166764 A1* | 6/2019 | Pitzer | A01D 46/30 |
| 2021/0387346 A1* | 12/2021 | Gillett | B25J 19/0075 |
| 2022/0221276 A1 | 7/2022 | Mao et al. | |

FOREIGN PATENT DOCUMENTS

| | | |
|---|---|---|
| CN | 112378390 A | 2/2021 |
| CN | 111854712 B | 3/2021 |
| CN | 213900372 U | 8/2021 |

OTHER PUBLICATIONS

Zhang et al., New Method and Experiment for Detecting Relative Position and Posture of the Hydraulic Support, 2019, IEEE, p. 1-13 (Year: 2019).*

Garcia et al., ROSI: A Novel Robotic Method for Belt Conveyor Structures Inspection, 2019, IEEE, p. 326-331 (Year: 2019).*

Huh et al., Development of an unmanned coal mining robot and a tele-operation system, 2011, IEEE, p. 31-35 (Year: 2011).*

* cited by examiner

MECHANICAL ARM TYPE MEASURING ROBOT DEVICE AND APPLICATION METHOD

CROSS REFERENCE TO RELATED APPLICATIONS

This application is based upon and claims priority to Chinese Patent Application No. CN202210928529.4, filed Aug. 3, 2022, the entire contents of which are incorporated herein by reference.

TECHNICAL FIELD

The present disclosure relates to the technical field of intelligent coal mine mining and, more particularly, to a mechanical arm type measuring robot device and a method for applying the mechanical arm type measuring robot device.

BACKGROUND

At present, operation in a mine working face is orientated to "safe with few people" and "safe without people". The key to realize the mine with few people or no people is the automatic measurement and transmission of geodetic coordinates and the automatic calibration of device coordinates, which lays a foundation for intelligent mining and related services. At present, working face measurement methods mainly have the following problems:

(1) In order to meet the demands of geodetic coordinate measurement for intelligent mining, man-machine interactive measurement (traverse survey requires three persons to participate and two control points) has the defects of many people, harsh environment, great difficulty and poor timeliness, and cannot achieve a purpose of reducing the number of people.

(2) When the working face advances, a whole spatial relationship may be destroyed, which cannot meet real-time positioning requirements of the intellectualized working face.

(3) In a fully mechanized mining face, a measuring robot is installed on a top beam of a hydraulic support. In a heading-working face, a measuring robot is installed on a top plate of the working face. However, this way of disposing the measuring robot at the upper portion or the top of the working face is only suitable for medium thick coal seam and thick coal seam working faces, but not for extremely thin coal seam and thin coal seam with limited height and space. If the measuring robot is applied to the extremely thin coal seam and the thin coal seam, the measuring robot may collide or rub against the mining devices due to the height of the measuring robot, and the devices is damaged and cannot continue working.

SUMMARY

In view of the above-mentioned problems, the present disclosure provides a method for automatic navigation and positioning cutting of a cantilever-type heading machine and a system.

An embodiment of the present disclosure provides a mechanical arm type measuring robot device, wherein the mechanical arm type measuring robot device comprises: an automatic leveling total station, a protection mechanism, a pitch adjusting mechanism, a yaw adjusting mechanism, a vertical rotating mechanism, a controller, a mounting base, and a mobile terminal;

the automatic leveling total station comprises: a total station, a lowered leveling mechanism, and a glass shade;

the total station is a measurement platform integrating automatic target search, automatic identification, automatic aiming, automatic angle measurement and distance measurement, automatic target tracking, automatic calculation, and automatic storage, wherein the total station is a gyro total station with a gyro north seeker or a total station without the gyro north seeker;

the lowered leveling mechanism is composed of three foot screws, and the lowered leveling mechanism is an automatic leveling mechanism of the total station and is configured for providing a horizontal reference for the total station;

the glass shade is a cuboid-shaped mechanism for accommodating the total station and the lowered leveling mechanism, and is configured for preventing the total station and the leveling mechanism from being affected by water and dust;

the glass shade is provided with a pitch angle sensor and a roll angle sensor, and the pitch angle sensor and the roll angle sensor are configured for accurately sensing a pitch angle and a roll angle of the glass shade;

the protection mechanism is arranged outside the glass shade, and a shape of the protection mechanism comprises a cuboid, a turtle shell or an irregular body, and a body of the mechanical arm type measuring robot is capable of being comprehensively protected, and the protection mechanism is configured for protecting the body of the mechanical arm type measuring robot from being influenced by dust and water when not working;

the protection mechanism is provided with an automatic blowing system, before the mechanical arm type measuring robot is used, the protection mechanism is opened, after the mechanical arm type measuring robot finishes working, dust and sundries at a joint of the protection mechanism are blown clean through the automatic blowing system, and then the protection mechanism is closed;

the pitch adjusting mechanism is a mechanical arm of the mechanical arm type measuring robot which performs extension and retraction actions in a pitching direction;

a pitch angle of the pitch adjusting mechanism is set to be any pitch angle value of −90° to 90°, to ensure that the total station moves to a designated position in the pitching direction, wherein when the total station is above a horizontal line, the angle is an elevation angle with a symbol of positive and in a range of 0° to 90°, and when the angle is 90°, the total station is vertically upward; and when the total station is below a horizontal line, the angle is a depression angle with a symbol of negative and in a range of −90° to 0°, and when the angle is −90°, the total station is vertically downward;

the pitch adjusting mechanism is provided with an obstacle detection sensor, wherein the obstacle detection sensor is configured for detecting an obstacle in a telescopic process of the pitch adjusting mechanism, and performing emergency stop protection and alarm prompt when the pitch adjusting mechanism encounters an obstacle during the telescopic process;

the pitch adjusting mechanism is further provided with a limit sensor, wherein the limit sensor is configured for the mechanical arm type measuring robot to reach a predetermined position in the pitching direction;

a power form of the pitch adjusting mechanism comprises hydraulic drive or electric drive;

the yaw adjusting mechanism is a mechanical arm that the mechanical arm type measuring robot performs extension and retraction actions in a yaw direction;

the yaw adjusting mechanism is provided with an obstacle detection sensor, wherein the obstacle detection sensor is configured for detecting an obstacle in a telescopic process of the yaw adjusting mechanism, and performing emergency stop protection and alarm prompt when the yaw adjusting mechanism encounters an obstacle during the telescopic process;

a yaw angle of the yaw adjusting mechanism is set to be any orientation angle value between 0° and 360°, to ensure that the total station moves in a predetermined yaw direction;

the yaw adjusting mechanism is further provided with a limit sensor, wherein the limit sensor is configured for the mechanical arm type measuring robot to reach a predetermined position in the yaw direction;

a power form of the yaw adjusting mechanism comprises hydraulic drive or electric drive;

the vertical rotating mechanism is a mechanism for driving the mechanical arm type measuring robot to rotate around a vertical central axis, and is configured for accurately controlling a yaw angle of the mechanical arm type measuring robot;

a control program of the mechanical arm type measuring robot device is deployed in the controller, and the control program moves the total station to reach a predetermined position according to a preset pitch angle and a preset pitch expansion length of the total station and a preset yaw angle and a preset yaw extension length of the total station that are preset, and controls the mechanical arm type measuring robot in an unattended manner in the whole process;

the mounting base is configured for fixing the mechanical arm type measuring robot device, and the mounting base is adapted to various mounting locations or equipment devices, comprising: above a bottom supporting oil cylinder mechanism of a hydraulic support in a fully mechanized mining face, between two columns of the hydraulic support in the fully mechanized mining face, on a cable trough in the fully mechanized mining face, on other equipment in the fully mechanized mining face, on a top of a centralized control bin in a tunneling face, on a tail of a tunnel boring machine (TBM) in the tunneling face, and on other equipment in the tunneling face;

the mobile terminal monitors a running state and alarm information of at least one mechanical arm type measuring robot device in real time, and sends a control instruction to the controller to control the mechanical arm type measuring robot based on man-machine interaction.

In some embodiments, the obstacle detection sensor of the pitch adjusting mechanism and the obstacle detection sensor of the yaw adjusting mechanism both detect various obstacles in the telescopic processes of respective corresponding adjusting mechanisms thereof in real time, and automatically intervene and start the emergency stop protection action of the mechanical arm type measuring robot in time to prevent a device or a person from being damaged or injured by extrusion and collision;

the obstacle detection sensor comprises a pressure sensor and a proximity alarm sensor;

the pitch adjusting mechanism and the yaw adjusting mechanism are based on the respective pressure sensors thereof, and when pressures of the respective adjusting mechanisms thereof exceed a pressure limit, the pitch adjusting mechanism and the yaw adjusting mechanism start the emergency stop protection of the mechanical arm type measuring robot, stop the extension and retraction actions of the respective adjusting mechanisms thereof, and give an alarm to prompt that the extension and retraction actions of the adjusting mechanisms are blocked, to prevent the total station, the device or the person from being damaged or injured;

the pitch adjusting mechanism and the yaw adjusting mechanism are based on the respective proximity alarm sensors of the pitch adjusting mechanism and the yaw adjusting mechanism, and when the person or the device approach, the pitch adjusting mechanism and the yaw adjusting mechanism start the emergency stop protection of the mechanical arm type measuring robot and give an audible and visual alarm, stop the extension and retraction actions of the respective adjusting mechanisms thereof, and give an alarm to prompt that the person or the device approach, to prevent the mechanical arm type measuring robot from colliding with the device or the person, wherein the proximity alarm sensor comprises an infrared camera, ultrasonic waves, video AI, UWB, a laser rangefinder and laser radar.

In some embodiments, a single pitch adjusting mechanism and a single yaw adjusting mechanism are used when a bearing requirement is met, and the total station is not capable of rolling in a roll direction; and when the bearing requirement is not met or the total station is possible to roll in the roll direction, the pitch adjusting mechanism uses at least two synchronous pitch mechanisms, and the yaw adjusting mechanism uses at least two yaw mechanisms to prevent problems of overweight and rolling in the roll direction.

In some embodiments, the mechanical arm type measuring robot comprises three states: an initial idle state, a working state and an emergency stop state;

the initial idle state is an idle state in which the total station is not working;

the working state is a normal working state in which the total station reaches a preset working position;

the emergency stop state is a state in which the pitch adjusting mechanism or the yaw adjusting mechanism encounters an obstacle in the telescopic process, and in which manual intervention is needed to eliminate problems;

wherein, the mechanical arm type measuring robot changes from the initial idle state to the working state after starting working, and the mechanical arm type measuring robot returns from the working state to the initial idle state after finishing working.

In some embodiments, based on the preset pitch angle and the preset yaw angle, the mechanical arm type measuring robot starts from an initial position, and performs extension and retraction actions in a plurality of degrees of freedom of the pitch adjusting mechanism and the yaw adjusting mechanism to move the total station to the preset working position;

after the total station is automatically leveled to complete measurement, the mechanical arm type measuring robot starts from the working position and performs extension and retraction actions in reverse order and reverse direction in the plurality of degrees of freedom of the pitch adjusting mechanism and the yaw adjusting mechanism to move the total station to the initial position.

In some embodiments, based on the preset pitch angle and the preset yaw angle, the mechanical arm type measuring robot performs pitch extension and retraction actions and yaw extension and retraction actions in two sequences: first pitch extension and retraction actions and then yaw extension and retraction actions, or first yaw extension and retraction actions and then pitch extension and retraction actions;

from the initial idle state to the working state, when the pitch adjusting mechanism performs the pitch extension and retraction actions first and then the yaw adjusting mechanism performs the yaw extension and retraction actions, then from the working state to the initial idle state, the yaw adjusting mechanism performs the yaw extension and retraction actions first and then the pitch adjusting mechanism performs the pitch extension and retraction actions to ensure repeatability of a motion track of the total station and guarantee passing ability of the total station; and from the initial idle state to the working state, when the yaw adjusting mechanism performs the yaw extension and retraction actions first and then the pitch adjusting mechanism performs the pitch extension and retraction actions, then from the working state to the initial idle state, the pitch adjusting mechanism performs the pitch extension and retraction actions first and then the yaw adjusting mechanism performs the yaw extension and retraction actions to ensure the repeatability of the motion track of the total station and guarantee the passing ability of the total station.

In some embodiments, the mechanical arm type measuring robot performs extension and retraction actions in the plurality of degrees of freedom of pitch and yaw based on the preset pitch angle and the preset yaw angle;

from the initial idle state to the working state, when the pitch adjusting mechanism or the yaw adjusting mechanism performs the extension action, then from the working state to the initial idle state, the yaw adjusting mechanism or the pitch adjusting mechanism performs the retraction action to ensure the repeatability of the motion track of the total station and guarantee the passing ability of the total station; and from the initial idle state to the working state, when the pitch adjusting mechanism or the yaw adjusting mechanism performs the retraction action, then from the working state to the initial idle state, the yaw adjusting mechanism or the pitch adjusting mechanism performs the extension action to ensure the repeatability of the motion track of the total station and guarantee the passing ability of the total station.

In some embodiments, after the body of the mechanical arm type measuring robot reaches the predetermined position, when the pitch angle and the roll angle of the glass shade exceed a preset angle range, the automatic levelling of the total station is not capable of being started, and the alarm is given to prompt that the pitch angle or the roll angle of the glass shade exceeds limit at a same time;

when the pitch angle and the roll angle of the glass shade are within the preset angle range, the total station is allowed to be started for working, and when the pitch angle and the roll angle of the glass shade exceed the preset angle range, the total station goes beyond a levelling range and is not capable of being automatically levelled due to space limitation of length, width and height of a cavity of the glass shade; and during the normal working process of the total station, the pitch angle and the roll angle of the glass shade are monitored in real time, and when the pitch angle and the roll angle of the glass shade exceed the preset angle range, the mechanical arm type measuring robot urgently stops working and gives the alarm to prompt that the pitch angle or the roll angle of the glass shade exceeds limit.

In some embodiments, a preset height and a preset width are reserved in the cavity space inside the glass shade, to meet a requirement that the total station freely rotates around a longitudinal axis for 360 degrees in the glass shade and an observation eyepiece freely rotates for 360 degrees, and ensure that the total station freely moves within a range of a maximum pitch angle and a maximum roll angle after being automatically levelled; and a common prism or a 360-degree prism is centrally installed at a top of the total station, so that a position of the total station is capable of being used as a forward-looking target point or a backward-looking control point of other total stations.

In a second aspect, an embodiment of the present disclosure provides a method for applying the mechanical arm type measuring robot device according to any one of embodiments in the first aspect, wherein taking performing of extension of the pitch adjusting mechanism and an extension action of the yaw adjusting mechanism from an initial state to a working state as an example, the method comprises:

after the mechanical arm type measuring robot is started from the initial idle state, performing the extension action of the pitch adjusting mechanism, wherein the obstacle detection sensor of the pitch adjusting mechanism detects whether the extension of the pitch adjusting mechanism encounters an obstacle in real time, and the limit sensor of the pitch adjusting mechanism detects whether the extension of the pitch adjusting mechanism is in place in real time;

when the pitch adjusting mechanism does not encounter the obstacle and is not in place, continuously extending the pitch adjusting mechanism until the pitch adjusting mechanism reaches a preset limit position, and when the obstacle is detected during the extension of the pitch adjusting mechanism, stopping the extension action of the pitch adjusting mechanism immediately, and prompting an extension alarm to the pitch adjusting mechanism to enter an emergency stop state;

after the mechanical arm type measuring robot finishes the extension action of the pitch adjusting mechanism, performing the extension action of the yaw adjusting mechanism, wherein the obstacle detection sensor of the yaw adjusting mechanism detects whether extension of the yaw adjusting mechanism encounters the obstacle in real time, and the limit sensor of the yaw adjusting mechanism detects whether the extension of the yaw adjusting mechanism is in place in real time;

when the yaw adjusting mechanism does not encounter the obstacle and is not in place, continuously extending the yaw adjusting mechanism until the yaw adjusting mechanism reaches the preset limit position, and when the obstacle is detected during the extension of the yaw adjusting mechanism, stopping the extension action of the yaw adjusting mechanism immediately, and prompting an extension alarm to the yaw adjusting mechanism to enter the emergency stop state;

after the mechanical arm type measuring robot finishes the extension action of the yaw adjusting mechanism, determining whether the pitch angle and the roll angle of the glass shade exceed limit;

when the pitch angle and the roll angle of the glass shade exceed limit, performing the emergency stop protection by the mechanical arm type measuring robot to give an alarm to prompt that the pitch angle or the roll angle of the glass shade exceeds limit, and when the pitch angle and the roll angle of the glass shade do not exceed limit, opening the protection mechanism;

after the protection mechanism is opened, the total station being automatically leveled and entering the normal working state;

in a normal working process of the total station, detecting whether the pitch angle and the roll angle of the glass shade exceed limit in real time;

when the pitch angle and the roll angle of the glass shade exceed limit, performing the emergency stop protection by the mechanical arm type measuring robot to give the alarm to prompt that the pitch angle or the roll angle of the glass shade exceeds limit;

after the total station finishes working, cleaning a joint of the protection mechanism by the automatic blowing system and closing the protection mechanism;

after the protection mechanism is closed, performing the retraction action of the yaw adjusting mechanism by the mechanical arm type measuring robot, wherein the obstacle detection sensor of the yaw adjusting mechanism detects whether retraction of the yaw adjusting mechanism encounters the obstacle in real time, and the limit sensor of the yaw adjusting mechanism detects whether the retraction of the yaw adjusting mechanism is in place in real time;

when the yaw adjusting mechanism does not encounter the obstacle and is not in place, continuously retracting by the yaw adjusting mechanism until the yaw adjusting mechanism reaches the preset limit position, and when the obstacle is detected during the retracting of the yaw adjusting mechanism, stopping the retraction action of the yaw adjusting mechanism immediately, and prompting a retracting alarm to the yaw adjusting mechanism to enter the emergency stop state;

after the mechanical arm type measuring robot finishes the retraction action of the yaw adjusting mechanism, performing the retraction action of the pitch adjusting mechanism, wherein the obstacle detection sensor of the pitch adjusting mechanism detects whether the retraction of the pitch adjusting mechanism encounters the obstacle in real time, and the limit sensor of the pitch adjusting mechanism detects whether the retraction of the pitch adjusting mechanism is in place in real time;

when the pitch adjusting mechanism does not encounter the obstacle and is not in place, continuously retracting the pitch adjusting mechanism until the pitch adjusting mechanism reaches a preset limit position, and when the obstacle is detected during the retraction of the pitch adjusting mechanism, stopping the retraction action of the pitch adjusting mechanism immediately, and prompting a retracting alarm to the pitch adjusting mechanism to enter the emergency stop state; and after the mechanical arm type measuring robot finishes the retraction action of the pitch adjusting mechanism, entering the initial idle state.

The mechanical arm type measuring robot device provided by the present disclosure is suitable for both coal mines and non-coal mines. Taking the total station in the daily work of the mine as the measuring tool, the millimeter-level reliable high-precision measurement ensures the positioning accuracy of the working face. With the dynamic advancing process of the working face, the mechanical arm type measuring robot device of the present disclosure may dynamically measure the three-dimensional geodetic coordinates of target points in the working face in real time.

In addition, the mechanical arm type measuring robot device is equipped with the obstacle detection sensor and the limit sensor, and has the function of emergency stop protection, which ensures the safety of a person and a device. The mechanical arm type measuring robot device of the present disclosure is not only suitable for medium-thick coal seams and thick coal seam working faces, but also may freely expand and retracts, and is also suitable for various mining environments such as extremely thin coal seams and thin coal seams and has excellent practicability.

BRIEF DESCRIPTION OF THE DRAWINGS

Various other advantages and benefits will become apparent to those of ordinary skills in the art upon reading the following detailed description of preferred embodiments. The accompanying drawings are only for the purpose of illustrating the preferred embodiments and are not to be deemed as limiting the present disclosure. Moreover, the same reference symbols are used to represent the same parts throughout the accompanying drawings. In the drawings.

DETAILED DESCRIPTION OF THE EMBODIMENTS

In order to make the above objects, characteristics and advantages of the present disclosure more obvious and easy to understand, the following is a further detailed description of the present disclosure in combination with the drawings and specific embodiments. It should be understood that the specific embodiments described here are only used to explain the present disclosure, only a part of the embodiments of the present disclosure, not all of the embodiments, and are not used to limit the present disclosure.

A mechanical arm type measuring robot device according to the embodiments of the present disclosure includes: an automatic leveling total station, a protection mechanism, a pitch adjusting mechanism, a yaw adjusting mechanism, a vertical rotating mechanism, a controller, a mounting base and a mobile terminal. The automatic leveling total station constitutes a body of the mechanical arm type measuring robot.

Figure 1:
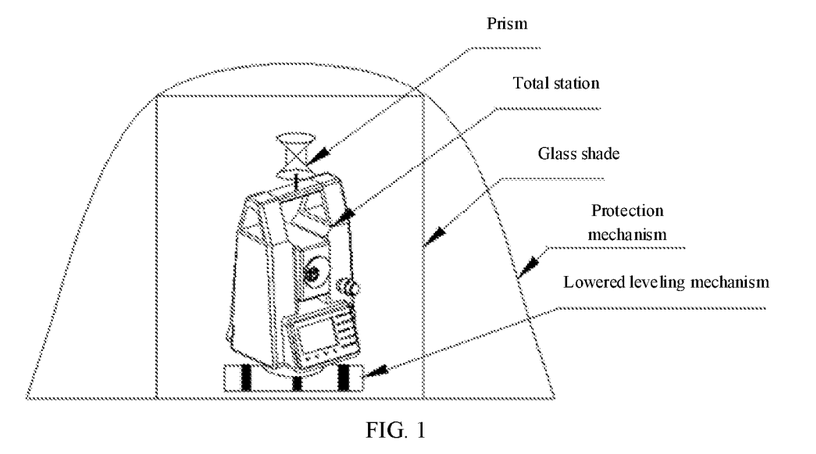
FIG. 1 is a diagram showing a structure of a body of a mechanical arm type measuring robot exemplarily illustrated according to the embodiments of the present disclosure.

The automatic leveling total station includes a total station, a lowered leveling mechanism and a glass shade. Moreover, in order to more accurately measure three-dimensional geodetic coordinates, a common prism or a 360-degree prism may also be centrally installed at a top of the total station, so that a position of the total station is capable of being used as a forward-looking target point or a backward-looking control point of other total stations. FIG. 1 exemplarily shows a structure diagram of a mechanical arm type measuring robot, which comprises a total station, a lowered leveling mechanism, a glass shade, one additional protection mechanism, and one prism.

According to the embodiments of the present disclosure, the total station is a measurement platform integrating automatic target search, automatic identification, automatic aiming, automatic angle measurement and distance measurement, automatic target tracking, automatic calculation and automatic storage, and the total station is a gyro total station with a gyro north seeker or a gyro total station without a gyro north seeker. The lowered leveling mechanism is composed of three or more foot-screws, and the lowered leveling mechanism is an automatic leveling mechanism of the total station and is configured for providing a horizontal reference for the total station.

The glass shade is a cuboid-shaped mechanism for accommodating the total station and the lowered leveling mechanism, and the glass shade is configured for preventing the total station and the leveling mechanism from being affected by water and dust. The glass shade is provided with a pitch angle sensor and a roll angle sensor (not shown in FIG. 1), and the pitch angle sensor and the roll angle sensor are configured for accurately sensing a pitch angle and a roll angle of the glass shade.

The glass shade is fully closed, and the total station can start to work only when the pitch angle and the roll angle of the glass shade are within a preset angle range. Because the pitch angle and the roll angle of the glass shade exceed the preset angle range, the total station goes beyond a levelling range and cannot be automatically levelled due to space limitation of length, width, and height of a cavity of the glass shade.

After the body of the mechanical arm type measuring robot reaches the predetermined position, when the pitch angle and the roll angle of the glass shade exceed a preset angle range, the automatic levelling of the total station is not capable of being started, and an alarm is given to prompt that the pitch angle or the roll angle of the glass shade exceeds limit.

During the normal working process of the total station, the pitch angle and the roll angle of the glass shade are monitored in real time, and when any of the pitch angle or the roll angle of the glass shade exceeds the preset angle range, the mechanical arm type measuring robot urgently stops working and gives the alarm to prompt that the pitch angle or the roll angle of the glass shade exceeds limit.

Figure 2:
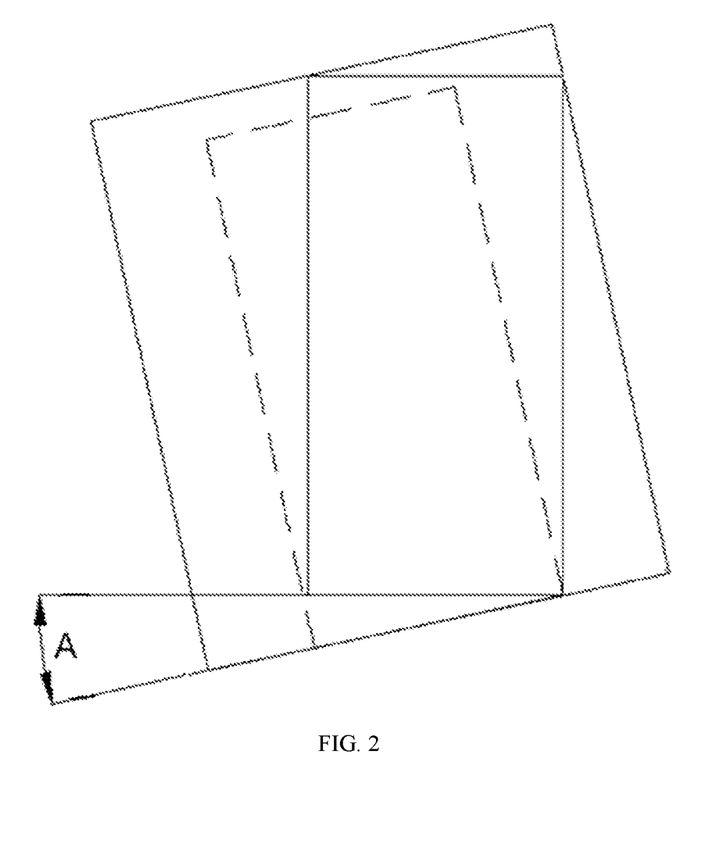
FIG. 2 is a schematic diagram of a range of a maximum pitch angle and a maximum roll angle in the embodiments of the present disclosure.

It is to be understood that a preset height and a preset width are reserved in the cavity space inside the glass shade, to meet a requirement that the total station freely rotates around a longitudinal axis for 360 degrees in the glass shade and an observation eyepiece freely rotates for 360 degrees, and it is also necessary to ensure that the total station freely moves within a range of a maximum pitch angle and a maximum roll angle after being automatically levelled. FIG. 2 is a schematic diagram of the range of the maximum pitch angle and the maximum roll angle, wherein A represents the range of the maximum pitch angle and the maximum roll angle.

The protection mechanism is arranged outside the glass shade, and a shape of the protection mechanism includes a cuboid, a turtle shell, or an irregular body, as long as a body of the mechanical arm type measuring robot is capable of being comprehensively protected, and the protection mechanism is configured for protecting the body of the mechanical arm type measuring robot from being influenced by dust and water when not working.

The protection mechanism is provided with an automatic blowing system (not shown in FIG. 1), before the mechanical arm type measuring robot is used, the protection mechanism is opened, after the mechanical arm type measuring robot finishes working, dust and sundries at a joint of the protection mechanism are blown clean through the automatic blowing system, and then the protection mechanism is closed.

The pitch adjusting mechanism is a mechanical arm of the mechanical arm type measuring robot which performs extension and retraction actions in a pitching direction. A pitch angle of the pitch adjusting mechanism is set to be any pitch angle value of −90° to 90°, to ensure that the total station moves to a designated position in the pitching direction, wherein when the total station is above a horizontal line, the angle is an elevation angle with a symbol of positive and in a range of 0° to 90°, and when the angle is 90°, the total station is vertically upward; and when the total station is below a horizontal line, the angle is a depression angle with a symbol of negative and in a range of −90° to 0°, and when the angle is −90°, the total station is vertically downward.

The pitch adjusting mechanism is provided with an obstacle detection sensor, wherein the obstacle detection sensor is configured for detecting an obstacle in a telescopic process of the pitch adjusting mechanism, and performing emergency stop protection and alarm prompt when the pitch adjusting mechanism encounters an obstacle during the telescopic process. The pitch adjusting mechanism is further provided with a limit sensor, wherein the limit sensor is configured for the mechanical arm type measuring robot to reach a predetermined position in the pitching direction. A power form of the pitch adjusting mechanism includes hydraulic drive or electric drive.

The yaw adjusting mechanism is a mechanical arm of the mechanical arm type measuring robot that performs extension and retraction actions in a yaw direction. The yaw adjusting mechanism is provided with an obstacle detection sensor, wherein the obstacle detection sensor is configured for detecting an obstacle in a telescopic process of the yaw adjusting mechanism, and performing emergency stop protection and alarm prompt when the yaw adjusting mechanism encounters an obstacle during the telescopic process.

A yaw angle of the yaw adjusting mechanism is set to be any orientation angle value between 0° and 360°, to ensure that the total station moves in a predetermined yaw direction. The yaw adjusting mechanism is further provided with a limit sensor, wherein the limit sensor is configured for the mechanical arm type measuring robot to reach a predetermined position in a yaw direction. A power form of the yaw adjusting mechanism includes hydraulic drive or electric drive.

The vertical rotating mechanism is a mechanism for driving the mechanical arm type measuring robot to rotate around a vertical central axis and is configured for accurately controlling a yaw angle of the mechanical arm type measuring robot. For example, a stepping motor is used to accurately control a yaw angle of the total station, and a steering gear is used to control the yaw angle of the total station to any preset fixed angle.

A control program of the mechanical arm type measuring robot device is deployed in the controller, and the control program moves the total station to reach a predetermined position according to a preset pitch angle and a pitch expansion length of the total station and a yaw angle and a yaw extension length of the total station and controls the mechanical arm type measuring robot in an unattended manner in the whole process.

The mounting base is configured for fixing the mechanical arm type measuring robot device, and the mounting base is adapted to various mounting locations or equipment devices, including: above a bottom supporting oil cylinder mechanism of a hydraulic support in a fully mechanized mining face, between two columns of the hydraulic support in the fully mechanized mining face, on a cable trough in the fully mechanized mining face, on other equipment in the fully mechanized mining face, on a top of a centralized control bin in the tunneling face, on a tail of a tunnel boring machine (TBM) in the tunneling face, and on other equipment in the tunneling face.

The mobile terminal monitors a running state and alarm information of at least one mechanical arm type measuring robot device in real time, and sends a control instruction to the controller, and the controller controls the mechanical arm type measuring robot by combining with the control instruction, using the controlling program, and being based on man-machine interaction.

In the embodiments of the present disclosure, the obstacle detection sensor of the pitch adjusting mechanism and the obstacle detection sensor of the yaw adjusting mechanism both detect various obstacles in the telescopic processes of respective corresponding adjusting mechanisms thereof in real time, and automatically intervene and start the emergency stop protection action of the mechanical arm type measuring robot in time to prevent a device or a person from being damaged or injured by extrusion and collision.

The obstacle detection sensor may include a pressure sensor and a proximity alarm sensor. The pitch adjusting mechanism and the yaw adjusting mechanism are based on the respective pressure sensors thereof, and when pressures of the respective adjusting mechanisms thereof exceeds a pressure limit, the pitch adjusting mechanism and the yaw adjusting mechanism start the emergency stop protection of the mechanical arm type measuring robot, stop the extension and retraction actions of the respective adjusting mechanisms thereof, and give the alarm to prompt that the extension and retraction actions of the adjusting mechanisms are blocked, to prevent the total station, the device or the person from being damaged or injured.

The pitch adjusting mechanism and the yaw adjusting mechanism are based on the respective proximity alarm sensors thereof, and when the person or the device approaches, the pitch adjusting mechanism and the yaw adjusting mechanism start the emergency stop protection of the mechanical arm type measuring robot and give an audible and visual alarm, stop the extension and retraction actions of the respective adjusting mechanisms thereof, and give an alarm to prompt that the personnel or equipment approaches, to prevent the mechanical arm type measuring robot the equipment from colliding with the person or the device, wherein the technology adopted by the proximity alarm sensor may include an infrared camera, ultrasonic waves, video AI, UWB, a laser rangefinder and laser radar.

For the pitch adjusting mechanism and the yaw adjusting mechanism, a weight of the total station and rolling of a single pitch adjusting mechanism and a single yaw adjusting mechanism in a roll direction need to be considered. If a single pitch adjusting mechanism and a single yaw adjusting mechanism are used, the pitch adjusting mechanism and the yaw adjusting mechanism which meet the bearing requirements and are anti-rolling need to be used. Otherwise, it is necessary to use at least two synchronous pitching mechanisms, and the yaw adjusting mechanism uses at least two yaw mechanisms to prevent problems of overweight and rolling in the roll direction.

For the entire device of the mechanical arm type measuring robot, which includes three states: an initial idle state, a working state and an emergency stop state. The initial idle state is an idle state in which the total station is not working. The working state is a normal working state in which the total station reaches the preset working position. The emergency stop state is a state in which the pitch adjusting mechanism or the yaw adjusting mechanism encounters an obstacle in the telescopic process, and in which manual intervention is needed to eliminate problems. The mechanical arm type measuring robot changes from the initial idle state to the working state after starting working, and the mechanical arm type measuring robot returns from the working state to the initial idle state after finishing working.

During the actual telescopic process, based on the preset pitch angle and the preset yaw angle, the mechanical arm type measuring robot starts from an initial position, and performs extension and retraction actions in a plurality of degrees of freedom of the pitch adjusting mechanism and the yaw adjusting mechanism to move the total station to the preset working position. After the total station is automatically leveled to complete measurement, the mechanical arm type measuring robot starts from the working position and performs extension and retraction actions in reverse order and reverse direction in the plurality of degrees of freedom of the pitch adjusting mechanism and the yaw adjusting mechanism to move the total station to the initial position. Specifically, the method may be as follows:

based on the preset pitch angle and the preset yaw angle, the mechanical arm type measuring robot performs pitch extension and retraction actions and yaw extension and retraction actions in two sequences: first pitch extension and retraction actions and then yaw extension and retraction actions, or first yaw extension and retraction actions and then pitch extension and retraction actions.

From the initial idle state to the working state, when the pitch adjusting mechanism performs the pitch extension and retraction actions first and then the yaw adjusting mechanism performs the yaw extension and retraction actions, then from the working state to the initial idle state, the order is reversed, the yaw adjusting mechanism performs the yaw extension and retraction actions first and then the pitch adjusting mechanism performs the pitch extension and retraction actions to ensure repeatability of a motion track of the total station and guarantee passing ability of the total station.

Naturally, it can be understood that, from the initial idle state to the working state, when the yaw adjusting mechanism performs the yaw extension and retraction actions first and then the pitch adjusting mechanism performs the pitch extension and retraction actions, then from the working state to the initial idle state, the order is reversed, the pitch adjusting mechanism performs the pitch extension and retraction actions first and then the yaw adjusting mechanism performs the yaw extension and retraction actions to ensure the repeatability of the motion track of the total station and guarantee passing ability of the total station.

After the body of the mechanical arm type measuring robot reaches the predetermined position, when the pitch angle and the roll angle of the glass shade exceed a preset angle range, the automatic levelling of the total station is not capable of being started, and an alarm is given to prompt that the pitch angle or the roll angle of the glass shade exceeds limit at the same time. This is because that when the pitch angle and the roll angle of the glass shade are within the preset angle range, the total station is allowed to be started for working, and when the pitch angle and the roll angle of the glass shade exceed the preset angle range, the total station goes beyond a levelling range and cannot be automatically levelled due to space limitation of length, width and height of a cavity of the glass shade.

During the normal working process of the total station, the pitch angle and the roll angle of the glass shade may be monitored in real time, and when the pitch angle and the roll angle of the glass shade exceed the preset angle range, the mechanical arm type measuring robot urgently stops working and gives the alarm to prompt that the pitch angle or the roll angle of the glass shade exceeds limit.

Figure 3:
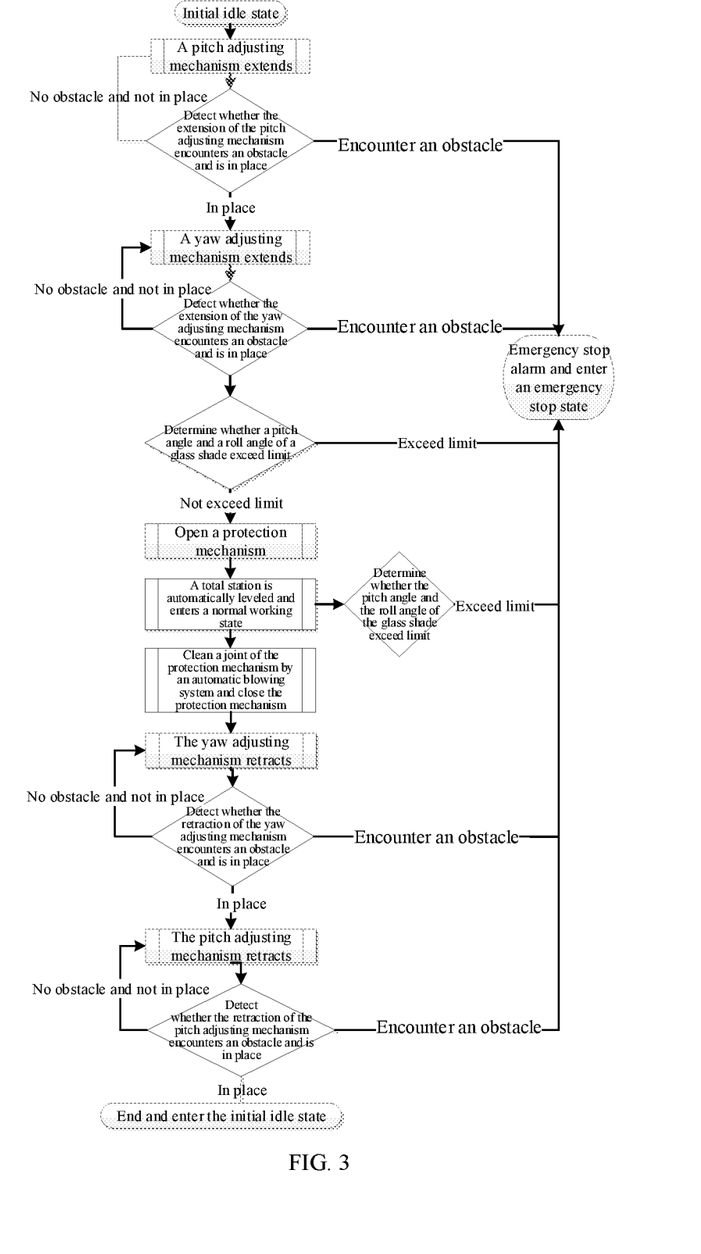
FIG. 3 is a working flow chart of the embodiments of the present disclosure, taking a pitch adjusting mechanism performing an extension action and a yaw adjusting mechanism performing an extension action from an initial state to a working state as an example.

Based on the above-mentioned mechanical arm type measuring robot device, the controller controls the mechanical arm type measuring robot device by using a control program, and in combination with the working flow chart shown in FIG. 3, a method of specifically applying the mechanical arm type measuring robot device, taking performing of the pitching extension and retraction actions first and then the yaw extension and retraction actions as an example, includes the following steps.

After the mechanical arm type measuring robot is started from the initial idle state, the extension action of the pitch adjusting mechanism is performed, wherein the obstacle detection sensor of the pitch adjusting mechanism detects whether the extension of the pitch adjusting mechanism encounters an obstacle in real time, and the limit sensor of the pitch adjusting mechanism detects whether the extension of the pitch adjusting mechanism is in place in real time.

When the pitch adjusting mechanism does not encounter the obstacle and is not in place, the pitch adjusting mechanism continuously extends until the pitch adjusting mechanism reaches a preset limit position, and when the obstacle is detected during the extension of the pitch adjusting mechanism, the extension action of the pitch adjusting mechanism is stopped immediately, and an extension alarm is prompted to the pitch adjusting mechanism to enter an emergency stop state.

After the mechanical arm type measuring robot finishes the extension action of the pitch adjusting mechanism, the extension action of the yaw adjusting mechanism is performed, wherein the obstacle detection sensor of the yaw adjusting mechanism detects whether extension of the yaw adjusting mechanism encounters the obstacle in real time, and the limit sensor of the yaw adjusting mechanism detects whether the extension of the yaw adjusting mechanism is in place in real time.

When the yaw adjusting mechanism does not encounter the obstacle and is not in place, the yaw adjusting mechanism continuously extends until the yaw adjusting mechanism reaches a preset limit position, and when the obstacle is detected during the retracting of the yaw adjusting mechanism, the extension action of the yaw adjusting mechanism is stopped immediately, and an extension alarm is prompted to the yaw adjusting mechanism to enter the emergency stop state.

After the mechanical arm type measuring robot finishes the extension action of the yaw adjusting mechanism, it is determined whether the pitch angle and the roll angle of the glass shade exceed limit. When the pitch angle and the roll angle of glass shade exceed limit, the emergency stop protection is performed by the mechanical arm type measuring robot to give an alarm to prompt that the pitch angle or the roll angle of the glass shade exceeds limit, and when the pitch angle and the roll angle of the glass shade do not exceed limit, the protection mechanism is opened.

After the protection mechanism is opened, the total station is automatically leveled and enters the normal working state. In a normal working process of the total station, the mechanical arm type measuring robot uses the pitch angle sensor and the roll angle sensor of the glass shade to detect whether the pitch angle and the roll angle of the glass shade exceed limit in real time. When the pitch angle and the roll angle of glass shade exceed limit, the emergency stop protection is performed by the mechanical arm type measuring robot to give an alarm to prompt that the pitch angle or the roll angle of the glass shade exceeds limit. When the pitch angle and the roll angle of glass shade do not exceed limit, the mechanical arm type measuring robot works normally.

After the total station finishes working, the joint of the protection mechanism is cleaned by the automatic blowing system and the protection mechanism is closed.

After the protection mechanism is closed, the mechanical arm type measuring robot performs the retraction action of the yaw adjusting mechanism first, the obstacle detection sensor of the yaw adjusting mechanism detects whether the retraction of the yaw adjusting mechanism encounters an obstacle in real time, and the limit sensor of the yaw adjusting mechanism detects whether the retraction of the yaw adjusting mechanism is in place in real time.

When the yaw adjusting mechanism does not encounter an obstacle and is not in place, the yaw adjusting mechanism continuously retracts until the yaw adjusting mechanism reaches a preset limit position, and when an obstacle is detected during the retracting of the yaw adjusting mechanism, the retraction action of yaw adjusting mechanism is stopped immediately, and a retracting alarm is prompted to the yaw adjusting mechanism to enter the emergency stop state.

After the mechanical arm type measuring robot finishes the retraction action of the yaw adjusting mechanism, the retraction action of the pitch adjusting mechanism is performed, the obstacle detection sensor of the pitch adjusting mechanism detects whether the retraction of the pitch adjusting mechanism encounters the obstacle in real time, and the limit sensor of the pitch adjusting mechanism detects whether the retraction of the pitch adjusting mechanism is in place in real time.

When the pitch adjusting mechanism does not encounter an obstacle and is not in place, the pitch adjusting mechanism continuously retracts until the pitch adjusting mechanism reaches a preset limit position, and when an obstacle is detected during the retraction of the pitch adjusting mechanism, the retraction action of the pitch adjusting mechanism is stopped immediately, and a retracting alarm is prompted to the pitch adjusting mechanism to enter the emergency stop state.

After the mechanical arm type measuring robot finishes the retraction action of the pitch adjusting mechanism, the mechanical arm type measuring robot enters the initial idle state, and the entire working flow ends.

From the initial idle state to the working state and from the working state to the initial idle state, the action order and extension and retraction action combination list of the pitch adjusting mechanism and the yaw adjusting mechanism are as follows:

| No. | Order | From the initial idle state to the working state | From the working state to the initial idle state |
|---|---|---|---|
| 1 | First pitch extension and | The pitch adjusting mechanism extends and the yaw adjusting mechanism extends | The yaw adjusting mechanism retracts and the pitch adjusting mechanism retracts |

| No. | Order | From the initial idle state to the working state | From the working state to the initial idle state |
| --- | --- | --- | --- |
| 2 | retraction and then yaw | The pitch adjusting mechanism extends and the yaw adjusting mechanism retracts | The yaw adjusting mechanism extends and the pitch adjusting mechanism retracts |
| 3 | extension and retraction | The pitch adjusting mechanism retracts and the yaw adjusting mechanism extends | The yaw adjusting mechanism retracts and the pitch adjusting mechanism extends |
| 4 | | The pitch adjusting mechanism retracts and the yaw adjusting mechanism retracts | The yaw adjusting mechanism extends and the pitch adjusting mechanism extends |
| 5 | First yaw extension and | The yaw adjusting mechanism extends and the pitch adjusting mechanism extends | The pitch adjusting mechanism retracts and the yaw adjusting mechanism retracts |
| 6 | retraction and then pitch | The yaw adjusting mechanism retracts and the pitch adjusting mechanism extends | The pitch adjusting mechanism retracts and the yaw adjusting mechanism extends |
| 7 | extension and retraction | The yaw adjusting mechanism extends and the pitch adjusting mechanism retracts | The pitch adjusting mechanism extends and the yaw adjusting mechanism retracts |
| 8 | | The yaw adjusting mechanism retracts and the pitch adjusting mechanism retracts | The pitch adjusting mechanism extends and the yaw adjusting mechanism extends |

The mechanical arm type measuring robot performs extension and retraction actions in a plurality of degrees of freedom of pitch and yaw based on the preset pitch angle and the preset yaw angle. From the initial idle state to the working state, when the pitch adjusting mechanism or the yaw adjusting mechanism performs the extension action, then from the working state to the initial idle state, the yaw adjusting mechanism or the pitch adjusting mechanism performs the retraction action to ensure repeatability of a motion track of the total station and guarantee the passing ability of the total station.

From the initial idle state to the working state, when the pitch adjusting mechanism or the yaw adjusting mechanism performs the retraction action, then from the working state to the initial idle state, the yaw adjusting mechanism or the pitch adjusting mechanism performs the extension action to ensure the repeatability of the motion track of the total station and guarantee the passing ability of the total station. From the above table, it can be known that no matter in any case, if a certain adjusting mechanism performs an extension action first from the initial idle state to the working state, the adjusting mechanism performs a retraction action after the other adjusting mechanism extends or retracts from the working state to the initial idle state. A certain adjusting mechanism performs a retraction action first from the initial idle state to the working state, the adjusting mechanism performs an extension action after the other adjusting mechanism extends or retracts from the working state to the initial idle state.

Based on the structure of the mechanical arm type measuring robot device and the application method thereof, it can be known that the mechanical arm type measuring robot device provided by the present disclosure is suitable for both coal mines and non-coal mines.

To sum up, the mechanical arm type measuring robot device of the present disclosure takes the total station in the daily work of the mine as the measuring tool, and the millimeter-level reliable high-precision measurement ensures the positioning accuracy of the working face. With the dynamic advancing process of the working face, the mechanical arm type measuring robot device of the present disclosure can dynamically measure the three-dimensional geodetic coordinates of object points in the working face marks in real time.

In addition, the mechanical arm type measuring robot device is equipped with the obstacle detection sensor and the limit sensor, and has the function of emergency stop protection, which ensures the safety of persons and devices. The mechanical arm type measuring robot device of the present disclosure is not only suitable for medium-thick coal seams and thick coal seam working faces, but also can freely expand and contract, and is also suitable for various mining environments such as extremely thin coal seams and thin coal seams, and has excellent practicability.

While an embodiment of the present application has been described, additional variations and modifications to the embodiment will occur to a person skilled in the art once the basic inventive concept is known. Therefore, it is intended that the appended claims be interpreted as including the embodiments and all alterations and modifications that fall within the scope of the present application.

Finally, it should also be noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or terminal device including a plurality of elements includes not only those elements but also includes other elements not expressly listed, or also incudes elements inherent to such a process, method, article, or device. In the absence of further limitation, an element defined by the phrase "including a . . . " does not exclude the presence of additional identical element in the process, method, article, or terminal device.

In the above, the embodiments of the present disclosure are described in combination with the drawings, but the present disclosure is not limited to the above specific embodiments. The above embodiments are only schematic, not restrictive. Under the enlightenment of the present disclosure, a person skilled in the art may also make many forms without breaking away from the scope protected by the purpose and claim of the present disclosure, which belong to the protection scope of the present disclosure.

What is claimed is:

1. A mechanical arm type measuring robot device, wherein the mechanical arm type measuring robot device comprises: an automatic leveling total station, a protection mechanism, a pitch adjusting mechanism, a yaw adjusting mechanism, a vertical rotating mechanism, a controller, a mounting base and a mobile terminal;

the automatic leveling total station comprises: a total station, a lowered leveling mechanism, and a glass shade;

the total station is a measurement platform integrating automatic target search, automatic identification, automatic aiming, automatic angle measurement and distance measurement, automatic target tracking, automatic calculation, and automatic storage, wherein the total station is a gyro total station with a gyro north seeker or a total station without the gyro north seeker;

the lowered leveling mechanism is composed of three foot screws, and the lowered leveling mechanism is an automatic leveling mechanism of the total station and is configured for providing a horizontal reference for the total station;

the glass shade is a cuboid-shaped mechanism for accommodating the total station and the lowered leveling mechanism, and is configured for preventing the total station and the leveling mechanism from being affected by water and dust;

the glass shade is provided with a pitch angle sensor and a roll angle sensor, and the pitch angle sensor and the roll angle sensor are configured for accurately sensing a pitch angle and a roll angle of the glass shade;

the protection mechanism is arranged outside the glass shade, and a shape of the protection mechanism comprises a cuboid, a turtle shell or an irregular body, and a body of the mechanical arm type measuring robot is capable of being comprehensively protected, and the protection mechanism is configured for protecting the body of the mechanical arm type measuring robot from being influenced by dust and water when not working;

the protection mechanism is provided with an automatic blowing system, before the mechanical arm type measuring robot is used, the protection mechanism is opened, after the mechanical arm type measuring robot finishes working, dust and sundries at a joint of the protection mechanism are blown clean through the automatic blowing system, and then the protection mechanism is closed;

the pitch adjusting mechanism is a mechanical arm of the mechanical arm type measuring robot which performs extension and retraction actions in a pitching direction;

a pitch angle of the pitch adjusting mechanism is set to be any pitch angle value of −90° to 90°, to ensure that the total station moves to a designated position in the pitching direction, wherein when the total station is above a horizontal line, the angle is an elevation angle with a symbol of positive and in a range of 0° to 90°, and when the angle is 90°, the total station is vertically upward; and when the total station is below a horizontal line, the angle is a depression angle with a symbol of negative and in a range of −90° to 0°, and when the angle is −90°, the total station is vertically downward;

the pitch adjusting mechanism is provided with an obstacle detection sensor, wherein the obstacle detection sensor is configured for detecting an obstacle in a telescopic process of the pitch adjusting mechanism, and performing emergency stop protection and alarm prompt when the pitch adjusting mechanism encounters an obstacle during the telescopic process;

the pitch adjusting mechanism is further provided with a limit sensor, wherein the limit sensor is configured for the mechanical arm type measuring robot to reach a predetermined position in the pitching direction;

a power form of the pitch adjusting mechanism comprises hydraulic drive or electric drive;

the yaw adjusting mechanism is a mechanical arm that the mechanical arm type measuring robot performs extension and retraction actions in a yaw direction;

the yaw adjusting mechanism is provided with an obstacle detection sensor, wherein the obstacle detection sensor is configured for detecting an obstacle in a telescopic process of the yaw adjusting mechanism, and performing emergency stop protection and alarm prompt when the yaw adjusting mechanism encounters an obstacle during the telescopic process;

a yaw angle of the yaw adjusting mechanism is set to be any orientation angle value between 0° and 360°, to ensure that the total station moves in a predetermined yaw direction;

the yaw adjusting mechanism is further provided with a limit sensor, wherein the limit sensor is configured for the mechanical arm type measuring robot to reach a predetermined position in the yaw direction;

a power form of the yaw adjusting mechanism comprises hydraulic drive or electric drive;

the vertical rotating mechanism is a mechanism for driving the mechanical arm type measuring robot to rotate around a vertical central axis, and is configured for accurately controlling a yaw angle of the mechanical arm type measuring robot;

a control program of the mechanical arm type measuring robot device is deployed in the controller, and the control program moves the total station to reach a predetermined position according to a preset pitch angle and a preset pitch expansion length of the total station and a preset yaw angle and a preset yaw extension length of the total station that are preset, and controls the mechanical arm type measuring robot in an unattended manner in the whole process;

the mounting base is configured for fixing the mechanical arm type measuring robot device, and the mounting base is adapted to various mounting locations or equipment devices, comprising: above a bottom supporting oil cylinder mechanism of a hydraulic support in a fully mechanized mining face, between two columns of the hydraulic support in the fully mechanized mining face, on a cable trough in the fully mechanized mining face, on other equipment in the fully mechanized mining face, on a top of a centralized control bin in a tunneling face, on a tail of a tunnel boring machine (TBM) in the tunneling face, and on other equipment in the tunneling face; and the mobile terminal monitors a running state and alarm information of at least one mechanical arm type measuring robot device in real time and sends a control instruction to the controller to control the mechanical arm type measuring robot based on man-machine interaction.

2. The mechanical arm type measuring robot device according to claim 1, wherein the obstacle detection sensor of the pitch adjusting mechanism and the obstacle detection sensor of the yaw adjusting mechanism both detect various obstacles in the telescopic processes of respective corresponding adjusting mechanisms thereof in real time, and automatically intervene and start the emergency stop protection action of the mechanical arm type measuring robot in time to prevent a device or a person from being damaged or injured by extrusion and collision;

the obstacle detection sensor comprises a pressure sensor and a proximity alarm sensor;

the pitch adjusting mechanism and the yaw adjusting mechanism are based on the respective pressure sensors thereof, and when pressures of the respective adjusting mechanisms thereof exceeds a pressure limit, the pitch adjusting mechanism and the yaw adjusting mechanism start the emergency stop protection of the mechanical arm type measuring robot, stop the extension and retraction actions of the respective adjusting mechanisms thereof, and give an alarm to prompt that the extension and retraction actions of the adjusting mechanisms are blocked, to prevent the total station, the device or the person from being damaged or injured;

the pitch adjusting mechanism and the yaw adjusting mechanism are based on the respective proximity alarm sensors thereof, and when the person or the device approach, the pitch adjusting mechanism and the yaw adjusting mechanism start the emergency stop protection of the mechanical arm type measuring robot and give an audible and visual alarm, stop the extension and retraction actions of the respective adjusting mechanisms thereof, and give an alarm to prompt that the person or the device approach, to prevent the mechanical arm type measuring robot from colliding with the device or the person, wherein the proximity alarm sensor comprises an infrared camera, ultrasonic waves, video AI, UWB, a laser rangefinder and laser radar.

3. The mechanical arm type measuring robot device according to claim 1, wherein a single pitch adjusting mechanism and a single yaw adjusting mechanism are used when a bearing requirement is met, and the total station is not capable of rolling in a roll direction; and when the bearing requirement is not met or the total station is possible to roll in the roll direction, the pitch adjusting mechanism uses at least two synchronous pitch mechanisms, and the yaw adjusting mechanism uses at least two yaw mechanisms to prevent problems of overweight and rolling in the roll direction.

4. The mechanical arm type measuring robot device according to claim 1, wherein the mechanical arm type measuring robot comprises three states: an initial idle state, a working state and an emergency stop state;

the initial idle state is an idle state in which the total station is not working;

the working state is a normal working state in which the total station reaches a preset working position; and the emergency stop state is a state in which the pitch adjusting mechanism or the yaw adjusting mechanism encounters an obstacle in the telescopic process, and in which manual intervention is needed to eliminate problems;

wherein, the mechanical arm type measuring robot changes from the initial idle state to the working state after starting working, and the mechanical arm type measuring robot returns from the working state to the initial idle state after finishing working.

5. The mechanical arm type measuring robot device according to claim 4, wherein based on the preset pitch angle and the preset yaw angle, the mechanical arm type measuring robot starts from an initial position, and performs extension and retraction actions in a plurality of degrees of freedom of the pitch adjusting mechanism and the yaw adjusting mechanism to move the total station to the preset working position; and after the total station is automatically leveled to complete measurement, the mechanical arm type measuring robot starts from the working position and performs extension and retraction actions in reverse order and reverse direction in the plurality of degrees of freedom of the pitch adjusting mechanism and the yaw adjusting mechanism to move the total station to the initial position.

6. The mechanical arm type measuring robot device according to claim 5, wherein based on the preset pitch angle and the preset yaw angle, the mechanical arm type measuring robot performs pitch extension and retraction actions and yaw extension and retraction actions in two sequences: first pitch extension and retraction actions and then yaw extension and retraction actions, or first yaw extension and retraction actions and then pitch extension and retraction actions;

from the initial idle state to the working state, when the pitch adjusting mechanism performs the pitch extension and retraction actions first and then the yaw adjusting mechanism performs the yaw extension and retraction actions, then from the working state to the initial idle state, the yaw adjusting mechanism performs the yaw extension and retraction actions first and then the pitch adjusting mechanism performs the pitch extension and retraction actions to ensure repeatability of a motion track of the total station and guarantee passing ability of the total station; and from the initial idle state to the working state, when the yaw adjusting mechanism performs the yaw extension and retraction actions first and then the pitch adjusting mechanism performs the pitch extension and retraction actions, then from the working state to the initial idle state, the pitch adjusting mechanism performs the pitch extension and retraction actions first and then the yaw adjusting mechanism performs the yaw extension and retraction actions to ensure the repeatability of the motion track of the total station and guarantee the passing ability of the total station.

7. The mechanical arm type measuring robot device according to claim 6, wherein the mechanical arm type measuring robot performs extension and retraction actions in the plurality of degrees of freedom of pitch and yaw based on the preset pitch angle and the preset yaw angle;

from the initial idle state to the working state, when the pitch adjusting mechanism or the yaw adjusting mechanism performs the extension action, then from the working state to the initial idle state, the yaw adjusting mechanism or the pitch adjusting mechanism performs the retraction action to ensure the repeatability of the motion track of the total station and guarantee the passing ability of the total station; and from the initial idle state to the working state, when the pitch adjusting mechanism or the yaw adjusting mechanism performs the retraction action, then from the working state to the initial idle state, the yaw adjusting mechanism or the pitch adjusting mechanism performs the extension action to ensure the repeatability of the motion track of the total station and guarantee the passing ability of the total station.

8. The mechanical arm type measuring robot device according to claim 1, wherein after the body of the mechanical arm type measuring robot reaches the predetermined position, when the pitch angle and the roll angle of the glass shade exceed a preset angle range, the automatic levelling of the total station is not capable of being started, and the alarm is given to prompt that the pitch angle or the roll angle of the glass shade exceeds limit at a same time;
  when the pitch angle and the roll angle of the glass shade are within the preset angle range, the total station is allowed to be started for working, and when the pitch angle and the roll angle of the glass shade exceed the preset angle range, the total station goes beyond a levelling range and is not capable of being automatically levelled due to space limitation of length, width and height of a cavity of the glass shade; and
  during the normal working process of the total station, the pitch angle and the roll angle of the glass shade are monitored in real time, and when the pitch angle and the roll angle of the glass shade exceed the preset angle range, the mechanical arm type measuring robot urgently stops working and gives the alarm to prompt that the pitch angle or the roll angle of the glass shade exceeds limit.

9. The mechanical arm type measuring robot device according to claim 1, wherein a preset height and a preset width are reserved in the cavity space inside the glass shade, to meet a requirement that the total station freely rotates around a longitudinal axis for 360 degrees in the glass shade and an observation eyepiece freely rotates for 360 degrees, and ensure that the total station freely moves within a range of a maximum pitch angle and a maximum roll angle after being automatically levelled; and
  a common prism or a 360-degree prism is centrally installed at a top of the total station, so that a position of the total station is capable of being used as a forward-looking target point or a backward-looking control point of other total stations.

10. A method for applying the mechanical arm type measuring robot device according to claim 1, wherein taking performing of extension of the pitch adjusting mechanism and an extension action of the yaw adjusting mechanism from an initial state to a working state as an example, the method comprises:
  after the mechanical arm type measuring robot is started from the initial idle state, performing the extension action of the pitch adjusting mechanism, wherein the obstacle detection sensor of the pitch adjusting mechanism detects whether the extension of the pitch adjusting mechanism encounters an obstacle in real time, and the limit sensor of the pitch adjusting mechanism detects whether the extension of the pitch adjusting mechanism is in place in real time;
  when the pitch adjusting mechanism does not encounter the obstacle and is not in place, continuously extending the pitch adjusting mechanism until the pitch adjusting mechanism reaches a preset limit position, and when the obstacle is detected during the extension of the pitch adjusting mechanism, stopping the extension action of the pitch adjusting mechanism immediately, and prompting an extension alarm to the pitch adjusting mechanism to enter an emergency stop state;
  after the mechanical arm type measuring robot finishes the extension action of the pitch adjusting mechanism, performing the extension action of the yaw adjusting mechanism, wherein the obstacle detection sensor of the yaw adjusting mechanism detects whether extension of the yaw adjusting mechanism encounters the obstacle in real time, and the limit sensor of the yaw adjusting mechanism detects whether the extension of the yaw adjusting mechanism is in place in real time;
  when the yaw adjusting mechanism does not encounter the obstacle and is not in place, continuously extending the yaw adjusting mechanism until the yaw adjusting mechanism reaches the preset limit position, and when the obstacle is detected during the extension of the yaw adjusting mechanism, stopping the extension action of the yaw adjusting mechanism immediately, and prompting an extension alarm to the yaw adjusting mechanism to enter the emergency stop state;
  after the mechanical arm type measuring robot finishes the extension action of the yaw adjusting mechanism, determining whether the pitch angle and the roll angle of the glass shade exceed limit;
  when the pitch angle and the roll angle of the glass shade exceed limit, performing the emergency stop protection by the mechanical arm type measuring robot to give an alarm to prompt that the pitch angle or the roll angle of the glass shade exceeds limit, and when the pitch angle and the roll angle of the glass shade do not exceed limit, opening the protection mechanism;
  after the protection mechanism is opened, the total station being automatically leveled and entering the normal working state;
  in a normal working process of the total station, detecting whether the pitch angle and the roll angle of the glass shade exceed limit in real time;
  when the pitch angle and the roll angle of the glass shade exceed limit, performing the emergency stop protection by the mechanical arm type measuring robot to give the alarm to prompt that the pitch angle or the roll angle of the glass shade exceeds limit;
  after the total station finishes working, cleaning a joint of the protection mechanism by the automatic blowing system and closing the protection mechanism;
  after the protection mechanism is closed, performing the retraction action of the yaw adjusting mechanism by the mechanical arm type measuring robot, wherein the obstacle detection sensor of the yaw adjusting mechanism detects whether retraction of the yaw adjusting mechanism encounters the obstacle in real time, and the limit sensor of the yaw adjusting mechanism detects whether the retraction of the yaw adjusting mechanism is in place in real time;
  when the yaw adjusting mechanism does not encounter the obstacle and is not in place, continuously retracting by the yaw adjusting mechanism until the yaw adjusting mechanism reaches the preset limit position, and when the obstacle is detected during the retracting of the yaw adjusting mechanism, stopping the retraction action of the yaw adjusting mechanism immediately, and prompting a retracting alarm to the yaw adjusting mechanism to enter the emergency stop state;
  after the mechanical arm type measuring robot finishes the retraction action of the yaw adjusting mechanism, performing the retraction action of the pitch adjusting mechanism, wherein the obstacle detection sensor of the pitch adjusting mechanism detects whether the retraction of the pitch adjusting mechanism encounters the obstacle in real time, and the limit sensor of the pitch adjusting mechanism detects whether the retraction of the pitch adjusting mechanism is in place in real time;
  when the pitch adjusting mechanism does not encounter the obstacle and is not in place, continuously retracting the pitch adjusting mechanism until the pitch adjusting mechanism reaches a preset limit position, and when the obstacle is detected during the retraction of the pitch adjusting mechanism, stopping the retraction action of the pitch adjusting mechanism immediately, and prompting a retracting alarm to the pitch adjusting mechanism to enter the emergency stop state; and after the mechanical arm type measuring robot finishes the retraction action of the pitch adjusting mechanism, entering the initial idle state.

11. The method according to claim 10, wherein the obstacle detection sensor of the pitch adjusting mechanism and the obstacle detection sensor of the yaw adjusting mechanism both detect various obstacles in the telescopic processes of respective corresponding adjusting mechanisms thereof in real time, and automatically intervene and start the emergency stop protection action of the mechanical arm type measuring robot in time to prevent a device or a person from being damaged or injured by extrusion and collision;

the obstacle detection sensor comprises a pressure sensor and a proximity alarm sensor;

the pitch adjusting mechanism and the yaw adjusting mechanism are based on the respective pressure sensors thereof, and when pressures of the respective adjusting mechanisms thereof exceeds a pressure limit, the pitch adjusting mechanism and the yaw adjusting mechanism start the emergency stop protection of the mechanical arm type measuring robot, stop the extension and retraction actions of the respective adjusting mechanisms thereof, and give an alarm to prompt that the extension and retraction actions of the adjusting mechanisms are blocked, to prevent the total station, the device or the person from being damaged or injured;

the pitch adjusting mechanism and the yaw adjusting mechanism are based on the respective proximity alarm sensors thereof, and when the person or the device approach, the pitch adjusting mechanism and the yaw adjusting mechanism start the emergency stop protection of the mechanical arm type measuring robot and give an audible and visual alarm, stop the extension and retraction actions of the respective adjusting mechanisms thereof, and give an alarm to prompt that the person or the device approach, to prevent the mechanical arm type measuring robot from colliding with the device or the person, wherein the proximity alarm sensor comprises an infrared camera, ultrasonic waves, video AI, UWB, a laser rangefinder and laser radar.

12. The method according to claim 10, wherein a single pitch adjusting mechanism and a single yaw adjusting mechanism are used when a bearing requirement is met and the total station is not capable of rolling in a roll direction; and when the bearing requirement is not met or the total station is possible to roll in the roll direction, the pitch adjusting mechanism uses at least two synchronous pitch mechanisms, and the yaw adjusting mechanism uses at least two yaw mechanisms to prevent problems of overweight and rolling in the roll direction.

13. The method according to claim 10, wherein the mechanical arm type measuring robot comprises three states: an initial idle state, a working state and an emergency stop state;

the initial idle state is an idle state in which the total station is not working;

the working state is a normal working state in which the total station reaches a preset working position; and the emergency stop state is a state in which the pitch adjusting mechanism or the yaw adjusting mechanism encounters an obstacle in the telescopic process, and in which manual intervention is needed to eliminate problems;

wherein, the mechanical arm type measuring robot changes from the initial idle state to the working state after starting working, and the mechanical arm type measuring robot returns from the working state to the initial idle state after finishing working.

14. The method according to claim 13, wherein based on the preset pitch angle and the preset yaw angle, the mechanical arm type measuring robot starts from an initial position, and performs extension and retraction actions in a plurality of degrees of freedom of the pitch adjusting mechanism and the yaw adjusting mechanism to move the total station to the preset working position; and after the total station is automatically leveled to complete measurement, the mechanical arm type measuring robot starts from the working position and performs extension and retraction actions in reverse order and reverse direction in the plurality of degrees of freedom of the pitch adjusting mechanism and the yaw adjusting mechanism to move the total station to the initial position.

15. The method according to claim 14, wherein based on the preset pitch angle and the preset yaw angle, the mechanical arm type measuring robot performs pitch extension and retraction actions and yaw extension and retraction actions in two sequences: first pitch extension and retraction actions and then yaw extension and retraction actions, or first yaw extension and retraction actions and then pitch extension and retraction actions;

from the initial idle state to the working state, when the pitch adjusting mechanism performs the pitch extension and retraction actions first and then the yaw adjusting mechanism performs the yaw extension and retraction actions, then from the working state to the initial idle state, the yaw adjusting mechanism performs the yaw extension and retraction actions first and then the pitch adjusting mechanism performs the pitch extension and retraction actions to ensure repeatability of a motion track of the total station and guarantee passing ability of the total station; and from the initial idle state to the working state, when the yaw adjusting mechanism performs the yaw extension and retraction actions first and then the pitch adjusting mechanism performs the pitch extension and retraction actions, then from the working state to the initial idle state, the pitch adjusting mechanism performs the pitch extension and retraction actions first and then the yaw adjusting mechanism performs the yaw extension and retraction actions to ensure the repeatability of the motion track of the total station and guarantee the passing ability of the total station.

16. The method according to claim 15, wherein the mechanical arm type measuring robot performs extension and retraction actions in the plurality of degrees of freedom of pitch and yaw based on the preset pitch angle and the preset yaw angle;

from the initial idle state to the working state, when the pitch adjusting mechanism or the yaw adjusting mechanism performs the extension action, then from the working state to the initial idle state, the yaw adjusting mechanism or the pitch adjusting mechanism performs the retraction action to ensure the repeatability of the motion track of the total station and guarantee the passing ability of the total station; and from the initial idle state to the working state, when the pitch adjusting mechanism or the yaw adjusting mechanism performs the retraction action, then from the working state to the initial idle state, the yaw adjusting mechanism or the pitch adjusting mechanism performs the extension action to ensure the repeatability of the motion track of the total station and guarantee the passing ability of the total station.

17. The method according to claim 10, wherein after the body of the mechanical arm type measuring robot reaches the predetermined position, when the pitch angle and the roll angle of the glass shade exceed a preset angle range, the automatic levelling of the total station is not capable of being started, and the alarm is given to prompt that the pitch angle or the roll angle of the glass shade exceeds limit at a same time;

when the pitch angle and the roll angle of the glass shade are within the preset angle range, the total station is allowed to be started for working, and when the pitch angle and the roll angle of the glass shade exceed the preset angle range, the total station goes beyond a levelling range and is not capable of being automatically levelled due to space limitation of length, width and height of a cavity of the glass shade; and during the normal working process of the total station, the pitch angle and the roll angle of the glass shade are monitored in real time, and when the pitch angle and the roll angle of the glass shade exceed the preset angle range, the mechanical arm type measuring robot urgently stops working and gives the alarm to prompt that the pitch angle or the roll angle of the glass shade exceeds limit.

18. The method according to claim 10, wherein a preset height and a preset width are reserved in the cavity space inside the glass shade, to meet a requirement that the total station freely rotates around a longitudinal axis for 360 degrees in the glass shade and an observation eyepiece freely rotates for 360 degrees, and ensure that the total station freely moves within a range of a maximum pitch angle and a maximum roll angle after being automatically levelled; and a common prism or a 360-degree prism is centrally installed at a top of the total station, so that a position of the total station is capable of being used as a forward-looking target point or a backward-looking control point of other total stations.

\* \* \* \* \*